US010365721B2

(12) United States Patent
Haist et al.

(10) Patent No.: US 10,365,721 B2
(45) Date of Patent: Jul. 30, 2019

(54) APPARATUS AND METHOD FOR PERFORMING A VARIABLE DATA CAPTURE PROCESS

(71) Applicant: SYMBOL TECHNOLOGIES, INC., Schaumburg, IL (US)

(72) Inventors: Paul D Haist, Toronto (CA); Scott A. Arnold, Etobicoke (CA); Graham G Marshall, Shoreham, NY (US); Konstantinos D Tsiopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 283 days.

(21) Appl. No.: 14/270,448

(22) Filed: May 6, 2014

(65) Prior Publication Data
US 2015/0323997 A1  Nov. 12, 2015

(51) Int. Cl.
*G06F 3/01* (2006.01)
*G06K 7/10* (2006.01)
*G06F 3/041* (2006.01)

(52) U.S. Cl.
CPC ............ *G06F 3/017* (2013.01); *G06F 3/0416* (2013.01); *G06K 7/1091* (2013.01); *G06K 7/10386* (2013.01)

(58) Field of Classification Search
CPC ..... G06F 3/017; G06F 3/0416; G06K 7/0004; G06K 7/1091; G06K 7/10386
See application file for complete search history.

(56) References Cited

U.S. PATENT DOCUMENTS

| 5,640,002 A | * | 6/1997 | Ruppert | G06K 7/0008 |
| | | | | 235/383 |
| 6,330,975 B1 | * | 12/2001 | Bunte | H04N 1/00127 |
| | | | | 235/470 |
| 6,913,199 B2 | * | 7/2005 | He | G06K 7/0004 |
| | | | | 235/447 |
| 7,280,096 B2 | * | 10/2007 | Marvit | G06F 1/1613 |
| | | | | 345/156 |
| 7,668,340 B2 | | 2/2010 | Cohen et al. | |

(Continued)

FOREIGN PATENT DOCUMENTS

CN    103677591 A    3/2014
CN    103718150 A    4/2014

(Continued)

OTHER PUBLICATIONS

International Search Report and Written Opinion dated Jul. 8, 2015 in counterpart PCT application PCT/US2015/028506.

*Primary Examiner* — Amare Mengistu
*Assistant Examiner* — Crystal Mathews

(57) ABSTRACT

A method and apparatus for performing a variable data capture process at a data capture device comprising a data capture module and a trigger mechanism is provided. In operation, the data capture device detects an initial activation of the trigger mechanism. In response to the activation, data capture is initiated at the data capture module. A continued activation of the trigger mechanism subsequent to the initial activation is also detected. Following the detection of the continued activation of the trigger mechanism, the device identifies an obtained gesture and performs a data capture operation based on the identified gesture.

17 Claims, 5 Drawing Sheets

(56) References Cited

U.S. PATENT DOCUMENTS

| | | | |
|---|---|---|---|
| 7,844,915 B2* | 11/2010 | Platzer | G06F 3/04845 345/173 |
| 8,096,475 B2* | 1/2012 | Perera | G06K 7/10881 235/454 |
| 8,619,147 B2 | 12/2013 | King et al. | |
| 2003/0034392 A1* | 2/2003 | Grimm | G06K 7/10881 235/385 |
| 2004/0056839 A1* | 3/2004 | Yoshihara | B60K 35/00 345/156 |
| 2005/0178832 A1* | 8/2005 | Higuchi | G06K 7/0004 235/440 |
| 2006/0017692 A1* | 1/2006 | Wehrenberg | G06F 1/1616 345/156 |
| 2007/0177803 A1* | 8/2007 | Elias | G06F 3/04883 382/188 |
| 2007/0236451 A1* | 10/2007 | Ofek | G06F 3/0304 345/157 |
| 2008/0024435 A1 | 1/2008 | Dohta | |
| 2008/0267537 A1* | 10/2008 | Thuries | G06K 7/10851 382/321 |
| 2010/0042954 A1* | 2/2010 | Rosenblatt | G06F 1/1626 715/863 |
| 2010/0125816 A1 | 5/2010 | Bezos | |
| 2010/0278393 A1 | 11/2010 | Snook et al. | |
| 2010/0306715 A1* | 12/2010 | Geisner | G06F 3/017 715/863 |
| 2011/0053641 A1* | 3/2011 | Lee | G06F 1/1626 455/556.1 |
| 2011/0078620 A1* | 3/2011 | Chiou | G06K 7/10722 715/781 |
| 2011/0169726 A1* | 7/2011 | Holmdahl | G06K 9/00342 345/156 |
| 2011/0254792 A1* | 10/2011 | Waters | G06F 1/1626 345/173 |
| 2011/0265039 A1* | 10/2011 | Lyon | G06F 3/04855 715/830 |
| 2012/0096400 A1* | 4/2012 | Cho | G06F 3/0482 715/810 |
| 2012/0113223 A1* | 5/2012 | Hilliges | G06F 3/00 348/46 |
| 2012/0200497 A1* | 8/2012 | Nasiri | G06F 3/017 345/157 |
| 2012/0224040 A1* | 9/2012 | Wang | G06K 7/10881 348/77 |
| 2012/0287059 A1* | 11/2012 | Bamford | G06F 3/0486 345/173 |
| 2013/0004016 A1 | 1/2013 | Karakotsios et al. | |
| 2013/0105565 A1* | 5/2013 | Kamprath | G06F 19/3475 235/375 |
| 2013/0147836 A1 | 6/2013 | Small et al. | |
| 2013/0147850 A1 | 6/2013 | Li et al. | |
| 2013/0181050 A1* | 7/2013 | McConnell | G06K 7/0004 235/440 |
| 2013/0227483 A1* | 8/2013 | Thorsander | G06F 3/04842 715/821 |
| 2013/0274016 A1* | 10/2013 | Gagner | G07F 17/3211 463/34 |
| 2014/0173529 A1* | 6/2014 | Hicks | G06F 3/04883 715/863 |
| 2014/0223384 A1* | 8/2014 | Graumann | G06F 3/012 715/863 |
| 2015/0324041 A1* | 11/2015 | Varley | G06F 3/0412 345/173 |

FOREIGN PATENT DOCUMENTS

| | | |
|---|---|---|
| EP | 2671137 A2 | 12/2013 |
| WO | 2012135935 A2 | 10/2012 |
| WO | 2013168171 A1 | 11/2013 |

\* cited by examiner

APPARATUS AND METHOD FOR PERFORMING A VARIABLE DATA CAPTURE PROCESS

BACKGROUND OF THE INVENTION

Data capture devices such as bar code scanners facilitate information retrieval from objects and locations in a convenient manner. For example, a bar code scanner may be used to read bar codes on prepackaged items at a point of sale. Accordingly, a checkout clerk may identify a product being purchased and its associated price by scanning a bar code and eliminating the need to type the information manually, speeding up the checkout process significantly.

Data capture is typically performed in a routine and rigid manner, repeating data scans in quick succession. For example, at a checkout, a purchased item is scanned within a matter of seconds to capture its identification and price, and this scan process is repeated for each item purchased. Variations from the routine data capture process may cause significant interruptions and delays. For example, scanning a purchased item twice typically means that the checkout clerk has to return to the point of sale station to void the duplicate scan. Accordingly, there is a need for an improved mechanism for performing a variable data capture process such as handling variations from a routine data capture process.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
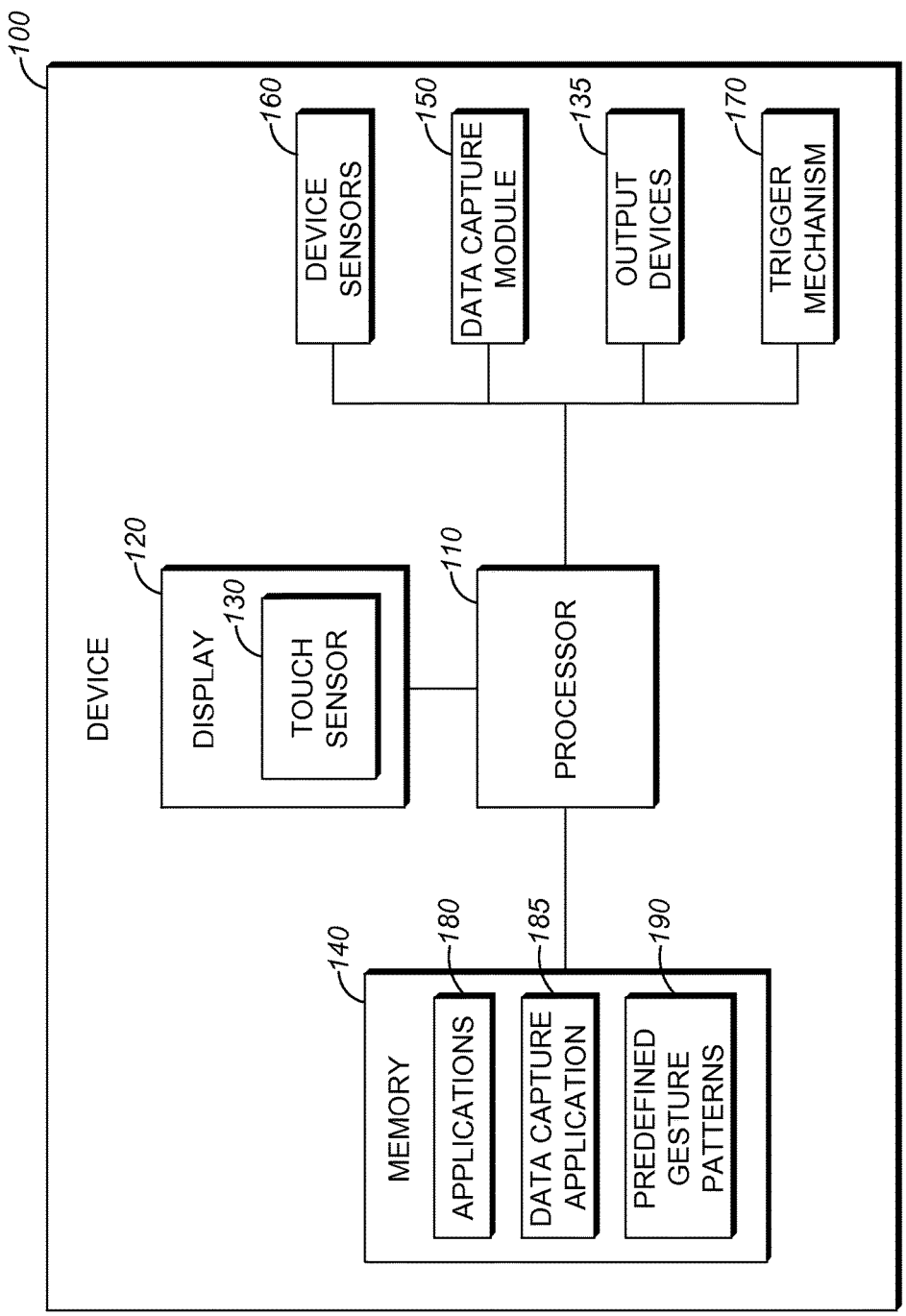
FIG. 1 is a block diagram of a data capture device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method and apparatus for performing a variable data capture process at a data capture device comprising a data capture module and a trigger mechanism is provided. In operation, the data capture device detects an initial activation of the trigger mechanism. In response to the activation, data capture is initiated at the data capture module. A continued activation of the trigger mechanism subsequent to the initial activation is also detected. Following the detection of the continued activation of the trigger mechanism, the device identifies an obtained gesture and performs a data capture operation based on the identified gesture.

FIG. 1 is a block diagram of a data capture device 100 in which methods and components required for performing a variable data capture process is implemented in accordance with the embodiments. The data capture device 100 may take form of, but is not limited to, wearable devices such as finger or head mounted devices, vehicle mounted devices, handheld devices such as a smartphone, a tablet, a bar code scanner, optical code reader and the like, a data capture terminal connected to a handheld device, a desktop, a vehicle mounted device, a laptop or notebook computer, an automated teller machine, a kiosk, a vending machine, a payment machine, facsimile machine, a point of sale device, a vehicle mounted device and the like.

The connection may be wired or wireless. In accordance with some embodiments, it will be appreciated that the connection may utilize a wireless communication system, a wired communication system, a broadcast communication system, or any other equivalent communication system. For example, the communication system may function utilizing any wireless radio frequency channel, for example, a one or two-way messaging channel, a mobile cellular telephone channel, or a mobile radio channel. Similarly, it will be appreciated that the communication system may function utilizing other types of communication channels such as Institute of Electrical and Electronics Engineers (IEEE) 802.11, IEEE 802.16 and/or Bluetooth channels. Further, it will be appreciated that the communication system may function utilizing a wireline communication channel such as a local area network (LAN) or a wide area network (WAN) or a combination of both. The LAN, for example, may employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or chargers. The WAN, for example, may use a physical network media such as X.25, Frame Relay, ISDN, Modem dial-up or other media to connect devices or other local area networks. In the following description, the term "communication system" or "connection" refers to any of the systems mentioned above or an equivalent. Embodiments may be advantageously implemented to perform variable data capture processes on the data capture device 100. Embodiments may be implemented in any electronic device performing data capture.

The data capture device 100 comprises a processor 110, a display 120 comprising one or more output devices 135, memory 140, a data capture module 150, one or more device sensors 160 and a trigger mechanism 170. The processor 110 runs or executes operating instructions or applications that are stored in the memory 140 to perform various functions for the data capture device 100 and to process data. The processor 110 includes one or more microprocessors, microcontrollers, digital signal processors (DSP), state machines, logic circuitry, or any device or devices that process information based on operational or programming instructions stored in the memory 140. In accordance with the embodiments, the processor 110 processes various functions and data associated with carrying out the variable data capture process.

The display 120 may be realized as an electronic display configured to graphically display information and/or content under the control of the processor 110. Depending on the implementation of the embodiment, the display 120 may be realized as a liquid crystal display (LCD), a touch-sensitive display, a cathode ray tube (CRT), a light emitting diode (LED) display, an organic light emitting diode (OLED) display, a plasma display, a projection display, or another suitable electronic display. The display 120 may provide a user interface between the data capture device 100 and a user. In some embodiments, display 120 may not be present.

In some embodiments, as shown in FIG. 1, the display 120 may optionally include a touch sensor 130 to form a touch screen. The touch sensor 130 can provide a user interface, for example an input interface that can complement an output interface provided by the display 120. The touch sensor 130 may have a touch-sensitive surface, sensor, or set of sensors that accepts input from the user based on haptic and/or tactile contact. The touch sensor 130 may be operated on by an input device (such as a finger of a user or other input device such as a stylus, including passive and active) to provide touch sensitive inputs to the data capture device 100. In accordance with some embodiments, the display 120 has a virtual keypad or keyboard that comprises a plurality of graphical keys or buttons arranged in a predetermined layout (for example, QWERTY keyboard or numeric/alpha numeric keypads) to allow the user to tap or touch the keys in a sequence to provide inputs to the data capture device 100. Although the block diagram of FIG. 1 shows touch sensor 130 to be an integral part of the display 120, in one embodiment, the data capture device 100 may include a display 120 that is separated from the touch sensor 130. In further embodiments, a touch sensor 130 may exist even when the data capture device 100 does not include a display 120. In yet other embodiments, there may be more than one touch sensor 130. In general, the term "touch sensor" will be used throughout the description to represent any touch sensitive surface or panel. In some embodiments, the touch sensor 130 may be used in conjunction with the display 120, to receive input during the data capture process on the data capture device 100.

The data capture module 150 includes one or more data sensors for capturing data from various data sources. A data sensor may be an optical sensor such as a charge-coupled device (CCD) sensor, a laser scanner and the like, that may capture data from optical data sources such as bar codes, quick response (QR) codes and video response (VR) codes and other similar optical data sources. Data sensors may also include electromagnetic sensors such as near field communication (NFC) sensors and radio frequency identification (RFID) readers that may capture data from electromagnetic data sources such as from RFID tags and NFC tags, acoustic sensors such as ultrasonic devices, or voice sensors and the like. The data capture module 150 may also include additional components to aid with its operation such as lasers for scanning optical data, optics for directing light to image sensors and antennae for aiding data reception by electromagnetic readers. To capture optical data, the optics of the data capture module 150 may be pointed at the data source, such as a bar code, at an appropriate distance. To capture RFID or NFC data, antennae associated with the RFID reader or NFC sensor are brought within a prescribed range of the item containing the RFID or NFC tag. In accordance with some embodiments, the data capture device 100 may include multiple data capture modules 150, each module including one or more data sensors.

The device sensors 160 may detect various physical forces applied to the data capture device 100. For example, motion sensors such as accelerometers and gyroscopes may detect acceleration and changes in orientation respectively. Other device sensors 160 such as pressure sensors may detect pressure applied to the housing or display 120 of the data capture device 100. A force sensor may be fabricated using any suitable force sensing technology. Device sensors 160 may include further sensors such as magnetometers, and the like.

The device sensors 160 may be placed on or in a portion of the data capture device 100 in predetermined numbers and arrangements. In one non-limiting example, where the data capture device 100 includes a grip, a pressure sensor may be incorporated as part of the grip, allowing the sensor to detect the amount of pressure (or strength of "squeeze") applied to the grip. In accordance with other embodiments, a plurality of accelerometers may be placed on or in the data capture device 100 so as to enable measuring motion along an associated plurality of axes. In accordance with such an arrangement, motion of the data capture device 100 may be detected. The plurality of accelerometers, for example, may comprise three accelerometers placed along perpendicular axes to provide for three dimensional motion detection of the data capture device 100. Each device sensor 160 provides indicators of forces detected to the processor 110, which may process the indicators as appropriate to determine motion and/or pressure.

The trigger mechanism 170 may be a virtual mechanism and/or a physical mechanism, the activation of which enables the performance of various operations and processes by data capture device 100. A physical trigger mechanism may include a physical switch, a capacitive or optical sensor, a pressure sensor, a microphone or other physical mechanisms which may be activated through the provision of an input such as pressure and/or touch applied to the mechanism. A virtual trigger mechanism may be implemented through software applications. For example, the display 120 in combination with touch sensor 130 may provide virtual trigger mechanisms such as one or more virtual keys or buttons on the display 120 which may be activated by providing an input to the touch sensor 130. In other mechanisms, the trigger mechanism 170 may be activated through provision of specific audio inputs such as voice commands and the like. The trigger mechanism 170 may be dedicated to triggering one single function or the function triggered through its activation may depend on the operational context of the data capture device 100. In some embodiments, activation of the trigger mechanism 170 may initiate a data capture by the data capture module 150.

The memory 140 may be an IC (integrated circuit) memory chip containing any form of RAM (random-access memory) or ROM (read-only memory), a CD-RW (compact disk with read write), a hard disk drive, a DVD-RW (digital versatile disc with read write), a flash memory card, external subscriber identity module (SIM) card or any other non-transitory medium for storing digital information. The memory 140 comprises applications 180, data gathering application 185 and predefined gesture patterns 190 corresponding to one or more predefined gestures. The applications 180 include various software and/or firmware programs necessary for the operation of the data capture device 100 as well as software and/or firmware programs (e.g. banking, email applications etc.) that address specific requirements of the user.

The data gathering application 185 includes instructions that may be executed by processor 110 to gather data from various data sources through the use of the data capture module 150 in accordance with a data capture process. Data sources may be located in or on items such as inventory, packed individually or in groups, machine parts, and the like and locations including walls, shelves, items stored in a warehouse, items transported in a truck, and the like. To perform the data gathering process, the data gathering application 185 may provide an indication that it is ready to receive captured data. Once the data capture device 100 is appropriately positioned to capture data from a data source, the trigger mechanism 170 is activated to initiate data capture through the data capture module 150. The captured data is then provided, by the processor 110, to the data gathering application 185. The data gathering application 185 may subsequently cause the processor 110 to process the captured data in accordance with instructions contained by the application 185. In some embodiments, the captured data may be processed prior to its provision to the data gathering application 185. In further embodiments, the processed data may be provided as an input to an input field of the data gathering application 185 and displayed on the display 120 accordingly.

In some embodiments, the data gathering application 185 may perform data capture operations as part of the data capture process. For example, the data gathering application 185 may obtain additional information regarding the captured data based on the performance of a data capture operation. Alternatively, or in addition, performance of a data capture operation may cause a variation from the normal data capture process. For example, when a data source is unintentionally scanned, the captured data may be prevented from being processed by the data gathering application 185. Accordingly, the data gathering application 185, upon performance of a data capture operation application 185, skips the processing of the captured data.

In some embodiments, the data gathering application 185 performs data gathering in accordance with a workflow specifying an ordered performance of data gathering. As an illustrative example, a workflow may specify a sequence of data captures to be performed to gather data. Accordingly, the data gathering application 185, in accordance with a step of the workflow, may provide an indication to capture data from the data capture module 150. Upon receiving and processing the captured data, the data gathering application 185 advances the workflow to the next step, and provides an indication to perform the next data capture. Where the data gathering application 185 operates in accordance with a workflow, performance of an operation as part of the data capture process may cause the data gathering application 185 to vary the workflow. For example, the data gathering application 185 may skip the performance of the current step; may vary from the performance of a next step by repeating the current step of the workflow or by moving to a step other than the next step; or may cause one or more steps of another workflow to be performed.

In some embodiments, a data capture operation may be initiated based upon detecting and identifying a gesture following the continued activation of the trigger mechanism 170 for a predetermined duration. The continued activation of the trigger mechanism 170 may follow, uninterrupted, the initial activation of the trigger mechanism 170. In some embodiments, detection of a gesture is initiated when the trigger mechanism 170 continues to be activated for a predetermined time after the initial activation of the trigger mechanism 170. In other embodiments, the detection of a gesture may be initiated after the data capture is completed, as indicated, for example, by a capture complete indicator that may be generated when data capture by the data capture module 150 is completed. Accordingly, the detecting may start, for example, after data capture is completed and the trigger mechanism 170 remains active for a predetermined period of time following the data capture completion. In some embodiments, the capture complete indicator may be triggered due to a fault in data capture by the data capture module, resulting in a failed data capture. In yet other embodiments, the data capture operation may be initiated based on detecting and identifying a gesture following a predetermined period after the trigger mechanism 170 is initiated or after the data capture is completed. In these embodiments, the trigger mechanism 170 may not remain activated during the predetermined period.

In some embodiments, a user of the data capture device 100 may be made aware that the data capture is complete by provision of a capture complete indicator through one or more of the output mechanisms 135 and/or display device 110. For example, providing a representation of the data at an input field of the data gathering application 185 may be used to indicate that data capture is complete. Accordingly, a user may wait until the data capture is completed, prior to providing a gesture. Delaying gesture provision until data capture is completed may limit potential interference with the gesture by the data capture process, by for example, increasing the likelihood that the data capture device 100 remains steady during data capture process.

To obtain a gesture, the processor 110 monitors the device sensors 160 for at least a predetermined period of time following the initiation of the detection process. In some embodiments, the monitoring continues as long as the trigger mechanism 170 continues to be activated and stops once the trigger mechanism 170 is no longer activated. Based on the monitoring, a sequence, in time, of sensor readings are collected resulting in obtaining a gesture sequence representing a gesture pattern. In some embodiments, the gesture sequence may be further processed to enhance the identifiability of gestures. In some embodiments, gesture sequences may also be obtained from the touch sensor 130, to complement the readings from the device sensors 160.

Gesture sequences obtained represent gesture patterns. Device gesture patterns are obtained when the data capture device 100 obtains a gesture though one or more of the device sensors 160, whereas touch gesture patterns are obtained when the data capture device 100 obtains a gesture through the touch sensor 130. Accordingly, device gesture patterns include any gesture patterns obtained through one or more device sensors 160, including accelerometers, gyroscopes, pressure sensors, magnetometers and the like. In some embodiments, device gestures may include shaking, tilting, rotating, and the like. For example, in an embodiment, a side to side translational movement of the data capture device 100 may result in the data capture device 100 obtaining a device gesture pattern represented by a sequence of sensor values obtained from an accelerometer corresponding to the movement. Alternatively, the data capture device 100 may obtain sensor values corresponding to a side to side or forward and backward tilt. In further embodiments, the data capture device being raised in an arc from a horizontal position to a vertical position with the touch screen facing a user may result in the data capture device 100 obtaining a device gesture pattern represented by a sequence of sensor values obtained from an accelerometer and a gyroscope corresponding to the movement. In other embodiments, the data capture device 100 may obtain another device gesture pattern represented by a sequence of sensor values from a gyroscope corresponding to the data capture device being rotated ninety degrees.

Touch gesture patterns include any gesture patterns obtained through one or more touch sensors 130. In some embodiments, touch gestures may include, swipe or slide. For example, in some embodiments, the data capture device 100 may obtain a touch gesture pattern from the touch sensor 130 corresponding to a swipe from an edge of the touch display 120 towards the middle of the display.

Gesture patterns may include patterns in space (spatial gestures) and/or time (temporal gestures). Spatial gesture patterns are patterns that are formed from inputs from the touch sensor 130 (touch gesture pattern) or from the device sensors 160 (device gesture pattern), the received gesture patterns, in each case, being based on a spatial pattern. In some embodiments, spatial patterns may be classified in accordance with a type of spatial pattern. For example, in some embodiments, a spatial gesture pattern may be shape based, corresponding to a particular shape, such as a circle, a "z" (for example as a pattern of points and/or lines), or the like. In other embodiments, a spatial pattern may be location based, corresponding, for example, to a movement related to specific regions of the touch display 120, such as a swipe from an edge to the center of the touch display 120 and the like. In further embodiments, the gesture pattern may be orientation based, corresponding to a change in orientation, or translation of a capture device 100. For example, the capture device 100 may be raised in an arc form, form a horizontal position to a vertical position. In yet other embodiments, a spatial gesture may be discrete, corresponding to a series of discrete inputs, such as touches at specific locations of the touch display 120 in a sequence and the like. In further embodiments, a spatial gesture may be continuous, corresponding to continuous movements, such as a continuous side-to side movement or the like. In variations, gestures may comprise a combination of two or more of the spatial pattern types.

Temporal gesture patterns are gesture patterns that are formed from inputs from the touch sensor 130 (touch gesture patterns) or the device sensors 160 (device gesture patterns), the received gesture patterns in each case being based on patterns in time. For example, the data capture device 100 may obtain a temporal device gesture pattern from the device sensors 160 in accordance with a temporal pattern such that detected movements are separated in time in accordance with a pattern in time. Alternatively, the device 100 may obtain, from a device sensor 160 that is a pressure sensor, a temporal gesture pattern corresponding to pressure changes, each pressure variation separated in accordance with a pattern in time. In some embodiments, temporal patterns may be classified in accordance with a type of temporal pattern. For example, in some embodiments, a temporal gesture pattern may be rhythm based, corresponding to a particular rhythm, such as providing touch to the touch display 120 in accordance with a tempo, or shaking the data capture device 100, up and down, in accordance with a rhythm. In further embodiments, a temporal gesture pattern may be speed based, correspond to a speed of movement, such as a flick on the touch display 120, a rapid tap on the touch display 120, or a flick of the data capture device 100 upwards. In yet other embodiments, a temporal gesture may be discrete, corresponding to a series of discrete inputs, such as detected touches at specific locations of the touch display 120 in a timed pattern and the like. In further embodiments, a temporal gesture may be continuous, corresponding to continuous movements, such as a timed pattern of continuous side-to side movement of the data capture device 100 or the like. In variations, gestures may comprise a combination of two or more of the temporal pattern types.

In some embodiments, a gesture pattern obtained can correspond to a combination of spatial and temporal patterns. For example, in one embodiment, a gesture pattern obtained may correspond to a rhythmic back and forth linear movement of an input on the touch display 120. In this example embodiment, the linear movement and its size would form a spatial pattern and the rhythmic nature of it would represent a temporal pattern.

In some embodiments, sensor values from different device sensors 160 and the touch sensor 130 may be included in a sequence to capture more complex gesture patterns. For example, in some embodiments, sensor values from an accelerometer and a gyroscope may be combined to represent a complex gesture including both translational and rotational movement.

In some embodiments, sequence of sensor values from different device sensors 160 and/or the touch sensor 130 may be processed to generate sequences of processed values forming a gesture pattern. For example, in some embodiments, the obtained sequences of sensor values may be processed to convert them into a pattern that facilitates the identifiability of gestures. As an illustrative example, in some embodiments, a sequence of acceleration values obtained from an accelerometer representing a gesture may be converted into a sequence of relative locations for the data capture device 100, indicating a relative path that the data capture device 100 has traversed in performing the gesture. The processing may occur at the data capture device 100, or may occur at a computing device external to the data capture device 100.

The obtained gesture pattern, in either raw or processed form, is compared to the predefined gesture patterns 190 representing predefined gestures. The comparison allows determining whether the obtained gesture pattern can be matched to a predefined one. In some embodiments, only a portion of the gesture pattern may be used for comparison purposes. For example, in some embodiments based on orientation based gestures, a specific final orientation in three dimensional space may be used for comparison purposes. Accordingly, in an example, identification may be based on the fact that at completion of the gesture, the capture device 100 ends up in an orientation with the device placed vertically, in a landscape mode. This identification may result regardless of the starting orientation of the capture device 100. Predefined gestures may include any gesture defined by an operator of the data capture device 100. Predefined gesture patterns corresponding to predefined gestures may be obtained, for example, using a data capture device 100, by performing a gesture and storing the corresponding pattern received on the device. Alternatively, predefined gesture patterns corresponding to predefined gestures may be obtained from sources external to the data capture device 100 such as other computing devices, servers and the like. In some embodiments, the comparison may be performed at a computing device external to the data capture device 100. In these embodiments, the obtained gesture sequence or pattern may be transmitted to an external computing device for performing the comparison to the predefined gesture pattern. Accordingly, in these embodiments, the predefined gesture patterns may be maintained externally to the data capture device 100.

When a match is identified, on the basis of the comparison, one or more operations associated with the matched predefined gesture patterns 190 is performed. In some embodiments, the obtained sequences of sensor values may be processed to convert them into a pattern that facilitates the identifiability of gestures. For example, a sequence of acceleration values obtained from an accelerometer representing a gesture may be converted into a sequence of relative locations for the data capture device 100, indicating a relative path that the data capture device 100 has traversed in performing the gesture. The processing may occur at the data capture device 100, or may occur at a computing device external to the data capture device 100.

Figure 2:
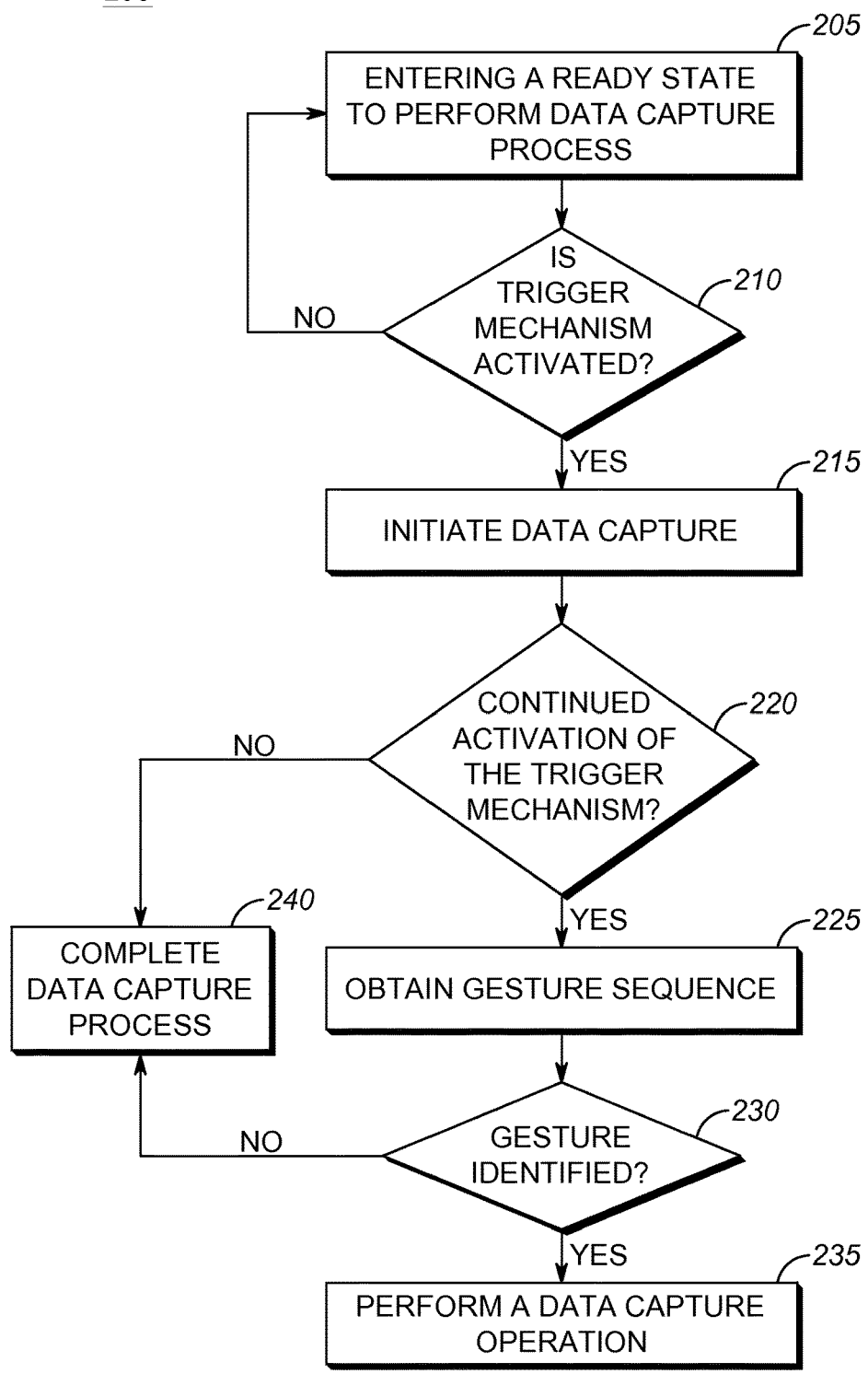
FIG. 2 is a flowchart of a method of variable data capture process in accordance with some embodiments.
Figure 3:
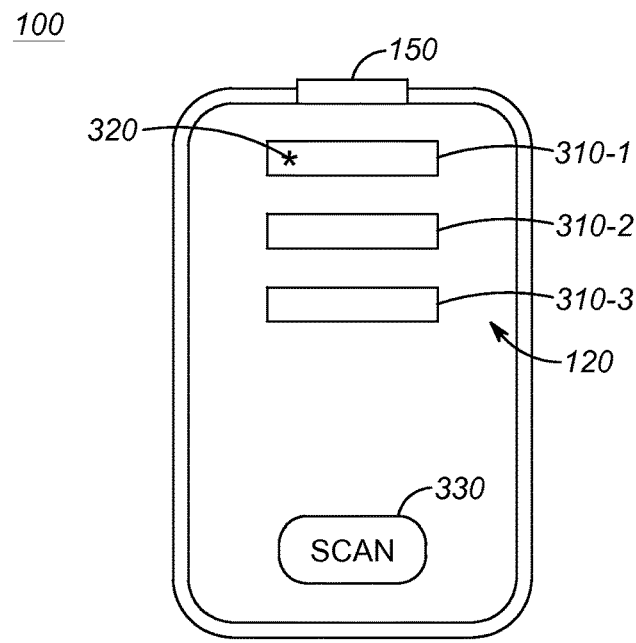
FIG. 3 illustrates a device user interface in accordance with some embodiments.

FIG. 2 represents a flowchart of a method 200 for performing a variable data capture process at the data capture device 100 of FIG. 1 in accordance with some embodiments. As shown in FIG. 2, the method 200 begins by entering the data capture device 100 into a ready state to perform a data capture process at block 205. In one embodiment, the data capture device 100 enters a ready state when the data gathering application 185 reaches a state where it is ready to accept captured data as an input. The ready state may be indicated by outputting readiness indicators at one or more of the display 120 and the output mechanisms 135. In one example, the data capture device 100 may generate an audible beep through a speaker, and provide a visible indication in the form of an asterisk in an input area. Referring now to FIG. 3, the display 120 of the data capture device 100 is shown including user interface elements for the data gathering application 185. Input boxes 310-1 through 310-3 are indicated, with the input box 310-1 including an asterisk 320, indicating that the data gathering application 185 is in a ready state to accept captured data to be processed and provided to the input box 310-1. The display 120 also includes a virtual trigger mechanism 170. In this example, the virtual trigger mechanism 170 is shown as a virtual button 330.

Figure 4:
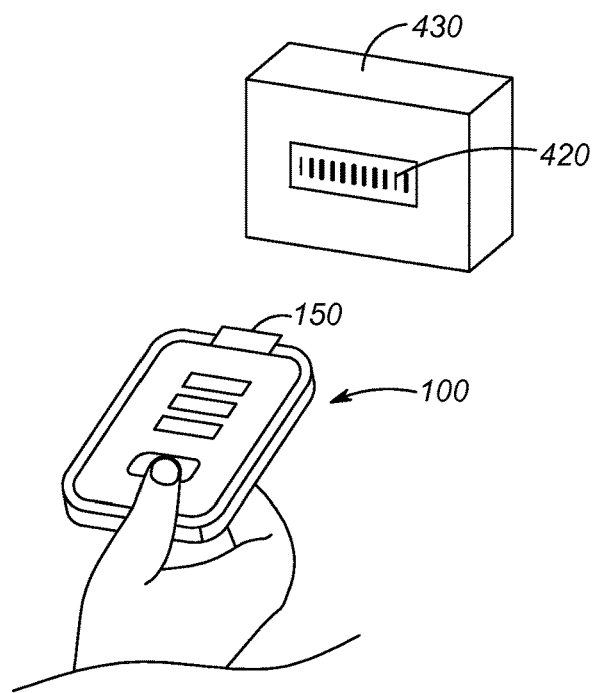
FIG. 4 illustrates the data capture device of FIG. 1 in use in accordance with some embodiments.

Returning to FIG. 2, at block 210, the trigger mechanism is monitored for activation. Referring to FIG. 4, typically, prior to the trigger mechanism 170 being activated, the data capture device 100 is positioned in a manner appropriate for capturing data through the data capture module 150, by for example, a user pointing the optical components of the data capture module 150 at the data source (a barcode) 420 on the item 430. In some embodiments, the activation may be achieved by providing an input to the trigger mechanism, by touching, pressing or otherwise interacting with the trigger mechanism 170. For example, the virtual trigger mechanism 170 of FIG. 3 may be activated by touching the indicated virtual button 330. The data capture device 100 remains in a state of readiness until an activation of the trigger mechanism is detected. In some embodiments, an indication may be provided of the data capture device 100's state of readiness after a certain amount of time elapses in this state as a reminder. In yet other embodiments, the state of readiness may be aborted after a period of time.

Figure 5:
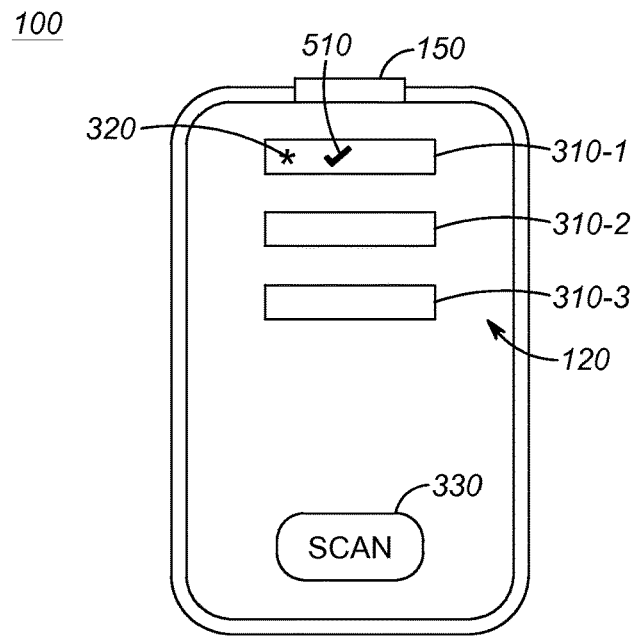
FIG. 5 illustrates a device user interface in accordance with some embodiments.

Referring back to FIG. 2, detecting an activation of the trigger mechanism 170 results in a data capture to be initiated at block 215. In some embodiments, the data capture process involves acquiring a representation of data contained at the data source through one or more of the data sensors included in the data capture module 150. For example, an image of the barcode 420 may be acquired. When the data capture is complete, the captured data is passed back to the data gathering application 185 to be provided, for example, as input for the input box 310-1. In some embodiments, when the data capture is complete, a capture complete indicator may also be generated. In some embodiments, the captured data may be processed, and the processed data may be provided to the input box 310-1. For example, as shown in FIG. 5, the input box 310-1 now includes a checkmark 510, which indicates that the captured data was received and processed successfully. In other embodiments, the indicator 510 may be presented in formats other than graphics, such as in a text or image format. The indicator 510 may include information obtained from the captured data and the information may be obtained from pre or post-processing of the data. In some embodiments, the indicator 510 may also serve as a capture complete indicator.

Returning to FIG. 2, at block 220, the processor 110 monitors the trigger mechanism 170 to detect a continued activation of trigger mechanism 170. In some embodiments, the trigger mechanism may continue to be activated, even after the data capture is initiated. For example, in some embodiments, the trigger mechanism 170 may continue to be activated through a continuous provision of an input to the trigger mechanism 170, beyond that which is required to initiate data capture. For example, touch input may continue to be provided to the virtual trigger mechanism of FIG. 3, the virtual button 330, even after the data capture is initiated. Continued activation may be provided intermittently, or may be provided continuously, in an uninterrupted manner.

In some embodiments, a continued activation is deemed to have occurred when the trigger mechanism 170 continues to be activated after a predetermined time period or duration elapses following the initial activation of the trigger mechanism. In other embodiments, a continued activation is deemed to have occurred when the trigger mechanism continues to be activated for a predetermined duration after the capture complete signal is generated. In some embodiments, the capture complete signal may indicate that the capture was not successful, for example, due to a corrupting of the captured data. When a continued activation of the trigger mechanism is not detected, the data capture process is allowed to progress to completion in accordance with the prescribed routine procedures as indicated at 240.

When a continued activation of the trigger mechanism is detected, the processor 110 may monitor one or more device sensors 160 to obtain a gesture sequence at block 225. In some embodiments, the activation mechanism 170 continues to be activated during the gesture monitoring. Once the trigger mechanism 170 is released, for example, the processor 110 stops monitoring for gestures.

Figure 6:
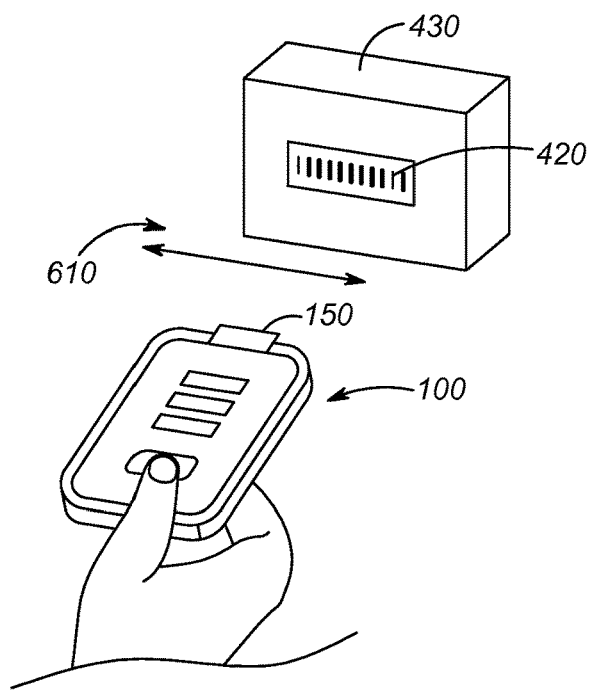
FIG. 6 illustrates the data capture device of FIG. 1 in use in accordance with some embodiments.

A gesture sequence represents spatial or temporal gesture patterns applied to the data capture device 100 as a result of performing a gesture. For example, referring to FIG. 6, a "scratch" gesture is indicated at 610. Accordingly, the data capture device 100 detects a movement that is back and forth, sideways, as indicated by arrows 610. The detection is based on the processor 110 receiving a sequence of sensor indicators from one or more device sensors 160 as a result of the gesture. The sequence of sensor values contain information representing the spatial and temporal gesture patterns defining the gesture. In some embodiments, the received gesture sequence may be further processed to better represent the gesture defining patterns. In some embodiments, a gesture obtained by the data capture device 100 may include translational and rotational movements, as well as a sequence of applied pressure changes. Moreover, these movements and pressures may also involve temporal patterns adding a rhythm and the like to the movements and pressure changes, for example. Accordingly, the obtained gesture pattern may include both spatial and temporal patterns.

The obtained gesture pattern is compared to predefined gesture patterns 190 to identify a gesture at block 230. In some embodiments, the data capture device 100 may maintain one or more predefined gesture patterns 190 which are predefined to correspond to specific gestures. These predefined gesture patterns may be received by the device 100, prior to performing method 200. In some embodiments, the predefined gesture patterns 190 may be supplied to the data capture device 100 during the operation of method 200.

To identify whether the newly obtained gesture is a predefined one, the obtained gesture pattern is compared to one or more predefined gesture patterns 190. When the comparison results in a match, the obtained gesture is identified as a predefined gesture. Matching a gesture pattern may be performed using various methods of pattern comparison. In some embodiments, the comparison occurs once the gesture applied to the data capture device 100 is completed. For example, when a detected gesture ceases, sensor values received will indicate no further motion. Accordingly, gesture identification may begin. In other embodiments, the identification may be performed on the fly, as the gesture is being obtained.

Waiting for a continued activation of a trigger in order to begin monitoring for and identifying a gesture may result in reduced errors in gesture identification. For example, the amplitude and duration of forces needed to identify gestures may be reduced since the use of the continued activation as an initiator of gesture detection reduces the need for exaggerated forces, which are typically required to distinguish gestures from inadvertent forces detected by the data capture device 100. Moreover, use of the continued activation as a trigger for monitoring for gestures reduces inadvertent forces being applied to the data capture device 100. This is because the same trigger mechanism used for activating data capture is used to mark gesture detection as well. Accordingly, the potential for applying inadvertent forces by reaching for a separate trigger mechanism is reduced.

When a detected gesture cannot be identified, or when a gesture is not detected despite a continued activation of the trigger mechanism 170, the data capture process can be completed as indicated at 240 in FIG. 2. In some embodiments, an indication may be provided that no gesture is detected, or that the obtained gesture cannot be identified. Once the indication is provided, monitoring for a gesture may be repeated for a predetermined period. After one or more repetitions, the data complete process may be completed as indicated at block 240.

Figure 7:
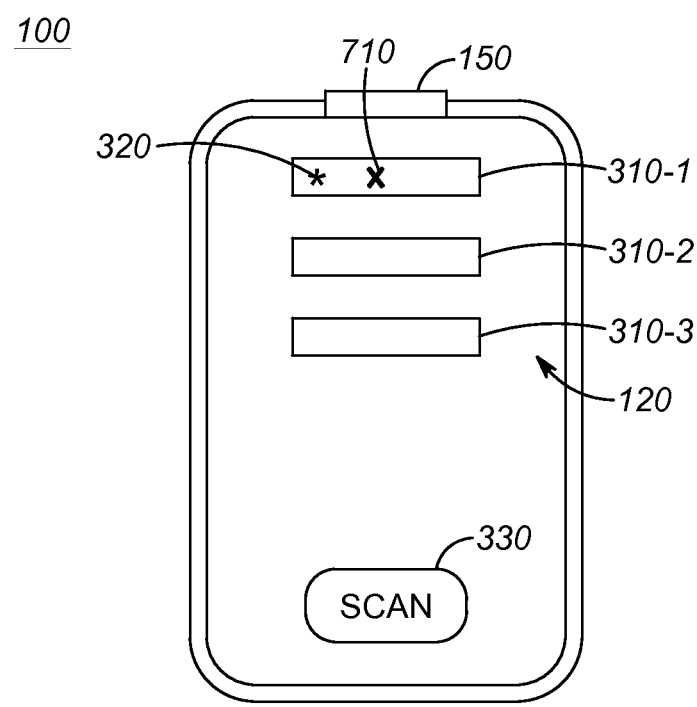
FIG. 7 illustrates a device user interface in accordance with some embodiments.

When a gesture is successfully identified at block 230, a corresponding operation is retrieved and performed. Each predefined gesture sequence has one or more data capture operations associated with it. Once an obtained gesture pattern is identified as a predefined one, a capture operation associated with matched predefined gesture patterns 190 is performed at block 235. For example, the "scratch" gesture indicated at FIG. 6 may cause a data capture operation to be performed that causes the data gathering application 185 to discard the newly obtained capture data. The discarding may be indicated as shown in FIG. 7 where the checkmark is replaced with an indicator 710, which in this example is an "X" indicating that the captured data is not going to be used. Upon discarding the captured data, the data gathering application 185 may return to its previous data capture ready state as indicated in FIG. 3. Alternatively, the data gathering application 185 may move to input-readiness state for obtaining input for the next input box 210-2, or move to some other state altogether.

In some embodiments, the data capture operations may be performed to accomplish any additional functionality associated with the data capture process. For example, in some embodiments, performance of a data capture operation may allow reception of additional information regarding captured data. Moreover, in further embodiments, performing a capture operation as a result of identifying a gesture may result in a variation from the performance of the data capture process as defined, for example, by the method 200. For example, in an embodiment, performance of a data capture operation may cause the captured data to be processed in a manner different from the default processing routines. As an example, typically unused image enhancement routines may be applied to the captured data, prior to the performance of default data processing. Alternatively, data capture operations may cause the captured data to be not processed at all, preserving it in its raw form. In other embodiments, data capture may be aborted when not already completed. As an alternative, data capture may be re-performed. When data is already captured, its delivery to the data gathering application 185 may be prevented, or the captured data may be altered prior to delivering to the data gathering application 185. In some embodiments where a data capture by the data capture module 150 fails, the data capture may be repeated.

In some embodiments, the data gathering application 185 may enter a data capture ready state, as part of executing a workflow, which may enable data to be captured in a prescribed order. For example, and returning to FIG. 3, the workflow may prescribe that the data capture process of method 200 is to be performed for each of the input boxes in sequence, where an input is first obtained for the input box 310-1, then for the input box 310-2 and finally for the input box 310-3. Accordingly, the data gathering application 185 may perform method 200 for populating the input box 310-1 first, followed by the input box 310-2 and subsequently the input box 310-3. In some embodiments, the data gathering application 185 may perform other operations or enter other states in between each performance of method 200.

In some embodiments, performing a data capture operation may result in a variation from the prescribed order of operations defined by the workflow. For example, performing a data capture operation may cause a repetition of the current step of the workflow. Accordingly, method 200, after being used to populate the input box 310-1 could be re-performed to once again obtain an input for the input box 310-1. In variations, performance of a data capture operation may cause the next step to be different from that prescribed by the workflow. For example, method 200, after being used to populate the input box 310-1 could be re-performed to obtain an input for input the box 310-3 as a result of a data capture operation performed as part of obtaining input for the input box 310-1. Alternatively, performance of a data capture operation may cause a previously performed step of the workflow to be altered. Moreover, the data captured prior to the performance of the data capture operation may provide context for the performance of the data capture operation. For example, in some embodiments, after capturing data A to populate the input box 310-1, data B to populate the input box 310-2, and data C to populate the input box 310-3, performance of a data capture operation following a second capturing of data A may cause data A to be removed from input box 310-1.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of performing a variable data capture process at a data capture device comprising a data capture module and a trigger mechanism, the method comprising:
   detecting, by the device, an initial activation of the trigger mechanism;
   initiating a data capture and capturing data from a data source disposed at a distance from the data capture device, by the data capture module, in response to the initial activation;
   processing the captured data associated with the data source disposed at the distance from the data capture device;
   receiving an indication that data capture is complete;
   detecting, by the device, a continued activation of the trigger mechanism subsequent to the initial activation;
   detecting, by the device, a gesture following the continued activation; and
   performing, by the device, a modification of the processed data associated with the data source disposed at the distance from the data capture device based on identifying the detected gesture following the continued activation of the trigger mechanism and subsequent to receiving the indication that the data capture is complete.

2. The method of claim 1, wherein the trigger mechanism is at least one of a physical trigger mechanism, a virtual trigger mechanism.

3. The method of claim 1 wherein detecting the continued activation of the trigger mechanism further comprises:
   detecting a continued activation of the trigger mechanism for a predetermined duration subsequent to the initial activation of the trigger mechanism.

4. The method of claim 1 wherein the detecting the gesture is performed for a predetermined duration.

5. The method of claim 1 wherein the data capture device is at least one of an optical sensor, a near field communication sensor, and a radio frequency identification reader.

6. The method of claim 1 wherein the detected gesture includes at least one of a pressure, a spatial and a temporal pattern.

7. The method of claim 6 wherein identifying the detected gesture comprises:
maintaining, in a memory of the device, at least one predefined gesture pattern;
obtaining, at the device, a gesture pattern; and
matching the obtained gesture pattern to at least one of the at least one predefined gesture pattern.

8. The method of claim 7 further comprising:
obtaining the gesture pattern when the trigger mechanism continues to be activated.

9. The method of claim 7 further comprising:
obtaining the gesture pattern for a predetermined time period.

10. The method of claim 1 wherein detecting the initial activation of the trigger mechanism comprises an initial part of the variable data capture process and performing the modification further comprises varying a remaining portion of the variable data capture process.

11. The method of claim 1 wherein detecting the initial activation of the trigger mechanism is performed as a step of a workflow and performing the modification further comprises varying a next step of the workflow.

12. The method of claim 11 further comprising:
completing a data capture by the data capture module; and
providing a context to the modification based on the data captured by the data capture module.

13. The method of claim 1 wherein detecting the initial activation of the trigger mechanism is performed as a current step of a workflow and performing the modification further comprises varying the current step of the workflow.

14. A data capture device comprising:
a housing;
a processor positioned within the housing;
a data capture module and a trigger mechanism connected to the processor and positioned within the housing, the processor operating to:
detect an initial activation of the trigger mechanism;
initiate a data capture and capture data from a data source disposed at a distance from the data capture device, by the data capture module, in response to the initial activation;
process the captured data associated with the data source disposed at the distance from the data capture device;
receive an indication that data capture is complete;
detect a continued activation of the trigger mechanism subsequent to the initial activation;
detect a gesture following the continued activation; and
perform a modification of the processed data associated with the data source disposed at the distance from the data capture device based on identifying the detected gesture following the continued activation of the trigger mechanism and subsequent to receiving the indication that the data capture is complete.

15. The device of claim 14 wherein detecting the continued activation of the trigger mechanism further comprises:
detecting a continued activation of the trigger mechanism for a predetermined duration subsequent to the initial activation of the trigger mechanism.

16. The device of claim 14 wherein detecting the initial activation of the trigger mechanism comprises an initial part of the variable data capture process and performing the modification further comprises varying a remaining portion of the variable data capture process.

17. The device of claim 14 wherein detecting the initial activation of the trigger mechanism is performed as a step of a workflow and performing the modification further comprises varying a next step of the workflow.

* * * * *

UNITED STATES PATENT AND TRADEMARK OFFICE
CERTIFICATE OF CORRECTION

| | |
|---|---|
| PATENT NO. | : 10,365,721 B2 |
| APPLICATION NO. | : 14/270448 |
| DATED | : July 30, 2019 |
| INVENTOR(S) | : Haist et al. |

It is certified that error appears in the above-identified patent and that said Letters Patent is hereby corrected as shown below:

On the Title Page

Under item (72) Inventors; the first inventor "Paul D. Haist, Toronoto (CA)", replace with -- Paul D. Haist, Toronto (CA) --

Signed and Sealed this
Third Day of January, 2023

Katherine Kelly Vidal
*Director of the United States Patent and Trademark Office*